Figure 1:
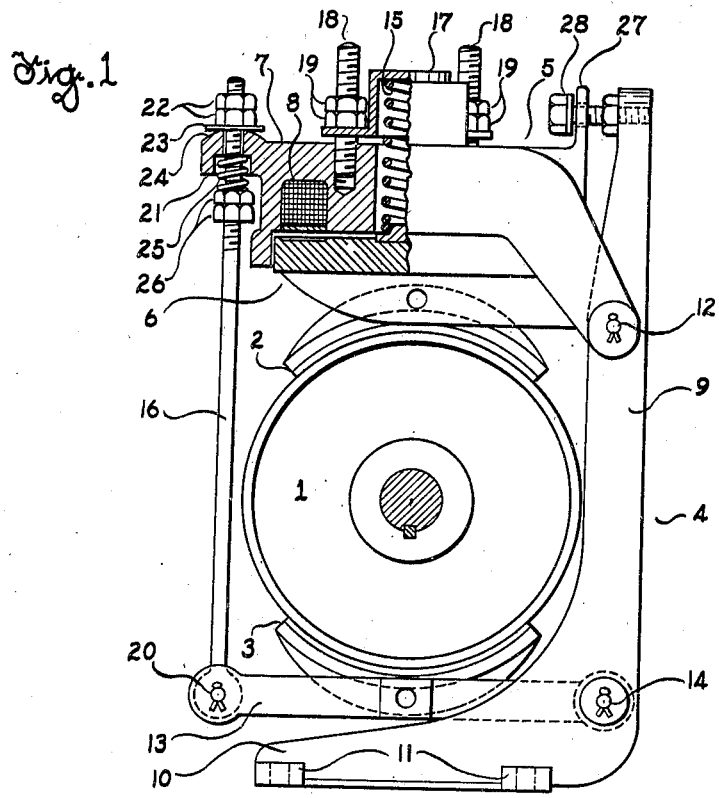

March 23, 1943.  A. E. LILLQUIST  2,314,451

ELECTROMAGNETIC BRAKE

Filed April 30, 1942

Inventor
Arvid E. Lillquist
By Frank H. Hubbard
Attorney

Patented Mar. 23, 1943

2,314,451

UNITED STATES PATENT OFFICE 2,314,451

ELECTROMAGNETIC BRAKE

Arvid E. Lillquist, Milwaukee, Wis., assignor to Cutler-Hammer, Inc., Milwaukee, Wis., a corporation of Delaware Application April 30, 1942, Serial No. 441,176

4 Claims. (Cl. 188—171)

This invention relates to improvements in electromagnetic brakes, and is particularly applicable to brakes of the type disclosed in the patent to B. E. Fernow, No. 1,474,960, of November 20, 1923.

The brake disclosed in the aforementioned patent is of the drum type and is provided with a base plate for mounting upon a vertically disposed pedestal or other supporting structure located to one side of the brake drum. The brake structure itself is exceedingly narrow in width but the pedestal or other supporting structure required for mounting thereof occupies additional space which is not available in some installations. Also the wear and equalizing adjustments of this brake are inaccessible in installations which afford only a small amount of lateral clearance on opposite sides of the brake.

The present invention has among its objects to provide an improved brake of the aforesaid type having its parts constructed and arranged to minimize the lateral space required for accommodation of the brake.

Another object is to provide a brake of the aforesaid type having adjusting means associated therewith including a wear adjustment and an equalizing adjustment, both of which are readily accessible from the top of the brake.

Various other objects and advantages of the invention will hereinafter appear.

The accompanying drawing illustrates an embodiment of the invention which will now be described, it being understood that the embodiment illustrated is susceptible of modification without departing from the spirit and scope of the appended claims.

Figure 2:
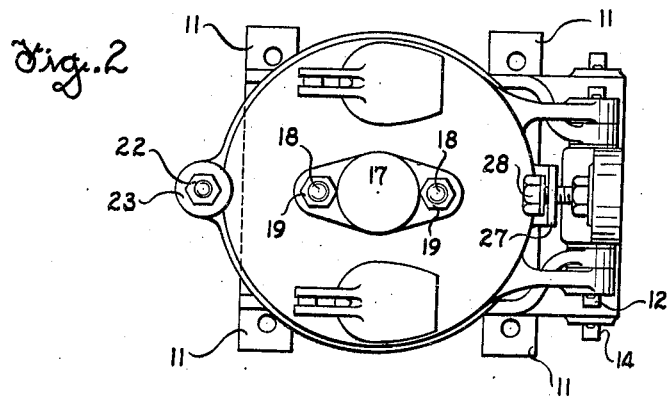

In the drawing,

Figure 1 is a side view of a brake embodying the invention, the operating magnet being shown partly in section, and Fig. 2 is a top plan view of the brake shown in Fig. 1.

Referring to the drawing, the same illustrates a brake drum 1 to be secured to the shaft of a motor or other device to be braked, and opposed upper and lower brake shoes 2 and 3 for engaging the periphery thereof. Brake shoes 2 and 3 are carried by an L-shaped supporting frame 4 which also carries an operating magnet 5 including a circular armature member 6, and a field member 7 of annular form having an operating winding 8 mounted thereon.

More specifically, the vertical leg 9 of frame 4 is located to one side of brake drum 1 and adjacent thereto and the horizontal leg 10 of said frame extends below said drum and is designed for floor mounting, the same having securing legs 11 formed on opposite sides thereof. Magnet 5 is arranged above the brake shoe 2 with its axis substantially perpendicular to the axis of drum 1 and the armature member 6 and field member 7 of said magnet are both pivotally mounted upon a pin 12 carried by the vertical leg 9 of frame 4. Brake shoe 2 is pivotally mounted upon the underside of armature member 6 and brake shoe 3 is pivotally mounted upon a horizontally disposed lever 13 which is supported at one end upon a pivot pin 14 carried by frame 4.

Armature member 6 and field member 7 are biased apart by a coil spring 15 and the free end of said field member is connected to the free end of lever 13 by a link 16. Spring 15 is located within the center opening in field member 7 and is held under compression between said field member and armature member 6 by a cup member 17. Cup member 17 is adjustably secured to the upper face of field member 7 by a pair of studs 18 having adjusting nuts 19 associated therewith. The lower end of link 16 is pivotally secured to the free end of lever 13 by a pin 20 and the upper end of said link is threaded and extends through an opening in a lug projection 21 formed on the free end of field member 7. The upper end of link 16 is provided with an adjustable stop comprising nuts 22 and a washer 23, said washer being held in engagement with a curved surface 24 on the upper side of lug projection 21 by a spring 25. Spring 25 engages the under side of lug projection 21 and is held under compression by nuts 26 carried by link 16.

As is apparent from the foregoing, when magnet winding 8 is deenergized field member 7 tends to move upwardly under the action of spring 15 to effect setting of brake shoe 3, and armature member 6 tends to move downwardly under the action of said spring to effect setting of brake shoe 2. With brake shoes 2 and 3 in set position there is an air gap between armature member 6 and field member 7 and upon energization of magnet winding 8 said field and armature members are attracted toward each other to spread said shoes and thereby release the same from drum 1.

Upon energization of magnet 5 armature member 6 and field member 7 tend to move downwardly under the influence of gravity. Unless downward movement of said field member is limited shoe 2 will be held in engagement with drum 1 by the weight of the magnet parts while shoe 3 will move away from drum 1 to a degree corresponding to the total movement of said field member. For equalizing the releasing movements of shoes 2 and 3 field member 7 has an upwardly extending projection 27 formed on the upper side thereof to be engaged by an adjustable screw stop 28 which is threaded into the upper end of the leg 9 of frame 4. Screw stop 28 is normally out of engagement with lug 27 and the same is set to arrest field member 7 in a position wherein armature member 6 will be attracted upwardly to a degree substantially equal to the degree of downward movement of said field member. Since the relative movement of shoes 2 and 3 is substantially equal to the relative movement of armature member 6 and field member 7, it is apparent that the stop 28 serves to equalize the releasing movements of said shoes. Wearing of the brake shoes 2 and 3 causes an increase in the air gap between armature member 6 and field member 7, and as is apparent the stop nuts 22 associated with link 16 are adjustable to compensate for such wear.

In connection with the foregoing it should be noted that the above described brake construction minimizes the lateral space required for accommodation of the brake. Also it should be noted that the various adjustments of the brake including the wear adjustment 22, the equalizing adjustment 28 and the spring adjustment 19 are all associated with the top of the brake whereby the same are readily accessible when the brake is installed with only a relatively small amount of clearance on opposite sides thereof.

What I claim as new and desire to secure by Letters Patent is:

1. In a brake, the combination with a brake drum and opposed upper and lower brake shoes for engaging the periphery thereof, of an L-shaped supporting frame having its horizontal leg arranged below said drum for floor mounting and its vertical leg arranged to one side of said drum and adjacent thereto, a lever pivoted to said frame and carrying said lower brake shoe, an operating magnet arranged above said upper brake shoe and including relatively movable field and armature members pivotally mounted upon the vertical leg of said frame, said upper brake shoe being operatively connected to one of said magnet members, a link connection between the other of said magnet members and said lever, a spring associated with said magnet members tending to move the same apart for setting of said brake shoes against the periphery of said drum, and adjustable stops accessible from the upper side of said magnet, one of said stops being mounted upon the upper end of the vertical leg of said frame and being engageable with one of said magnet members to provide for substantially equal movements of said brake shoes upon energization of said electromagnet and another of said stops being associated with the upper end of said link and engaging one of said magnet members to provide for adjustment of the normal air gap between said magnet members.

2. In a brake, the combination with a brake drum and opposed upper and lower brake shoes for engaging the periphery thereof, of an L-shaped supporting frame having its horizontal leg arranged below said drum for floor mounting and its vertical leg arranged to one side of said drum and adjacent thereto, a lever pivoted to said frame and carrying said upper brake shoe, an operating magnet arranged above said upper brake shoe and including relatively movable field and armature members pivotally mounted upon the vertical leg of said frame, said upper brake shoe being carried upon said armature member, a link connection between the free end of said field member and said lever, a spring associated with said magnet members tending to move the same apart for setting of said brake shoes against the periphery of said drum, and adjustable stops accessible from the upper side of said magnet, one of said stops being mounted upon the upper end of the vertical leg of said frame and being engageable with said field member to provide for substantially equal movements of said brake shoes upon energization of said electromagnet and another of said stops being associated with the upper end of said link and engaging said field member to provide for adjustment of the normal air gap between said field and armature members.

3. In a brake, the combination with a brake drum and opposed upper and lower brake shoes for engaging the periphery thereof, of an L-shaped supporting frame having its horizontal leg arranged below said drum for floor mounting and its vertical leg arranged to one side of said drum and adjacent thereto, a lever pivoted to said frame and carrying said lower brake shoe, a circular operating magnet arranged above said upper brake shoe with its axis substantially perpendicular to the axis of said drum, said operating magnet including relatively movable field and armature members concentrically pivoted to the vertical leg of said frame, said upper brake shoe being carried by said armature member, a link connection between the free end of said field member and said lever, a spring associated with said magnet members tending to move the same apart for setting of said brake shoes against the periphery of said drum, means associated with said magnet and accessible from the upper side thereof for adjusting said spring, a stop mounted upon the upper end of the vertical leg of said frame and engageable with said field member to provide for substantially equal movements of said brake shoe upon energization of said electromagnet, and a stop associated with the upper end of said link and engaging said field member to provide for adjustment of the normal air gap between said field and armature members.

4. In a brake unit, the combination with a brake drum and opposed upper and lower brake shoes for engaging the periphery thereof, of an L-shaped supporting frame having its horizontal leg arranged beneath said drum for floor mounting and its vertical leg arranged to one side of said drum and adjacent thereto, an operating magnet arranged above said upper brake shoe with its axis substantially perpendicular to the axis of said drum, said operating magnet being mounted upon the upper end of the vertical leg of said frame and including relatively movable field and armature members, a spring associated with said magnet members tending to move the same apart, operating connections between said brake shoes and said magnet for effecting setting of said shoes against the periphery of said drum under the action of said spring when said magnet is deenergized, said operating connections including an adjustable link between said magnet and said lower brake shoe to provide for variation of the normal air gap between said magnet members, said link together with said magnet defining an outer boundary for the brake unit, and adjustable means to limit downward movement of the lower brake shoe for equalization of movement of the two brake shoes, said adjustable means and said adjustable link having their adjusting parts adjacent the aforementioned outer boundary for ready accessibility.

ARVID E. LILLQUIST.